US008224257B2

(12) United States Patent
Reunamäki et al.

(10) Patent No.: US 8,224,257 B2
(45) Date of Patent: Jul. 17, 2012

(54) COLLABORATIVE SPECTRUM SENSING IN RADIO ENVIRONMENT

(75) Inventors: Jukka Reunamäki, Tampere (FI); Arto Palin, Viiala (FI)

(73) Assignee: Nokia Corporation, Espoo (FI)

( * ) Notice: Subject to any disclaimer, the term of this patent is extended or adjusted under 35 U.S.C. 154(b) by 207 days.

(21) Appl. No.: 12/732,792

(22) Filed: Mar. 26, 2010

(65) Prior Publication Data
US 2011/0237200 A1 Sep. 29, 2011

(51) Int. Cl.
H04B 17/00 (2006.01)
(52) U.S. Cl. ............... 455/67.11; 455/434; 455/450; 370/329; 370/330
(58) Field of Classification Search ............ 455/67.11, 455/434, 450, 464, 512, 516, 519, 527; 370/329, 370/330, 443, 444, 395.42
See application file for complete search history.

(56) References Cited

U.S. PATENT DOCUMENTS

| 7,742,764 | B2 * | 6/2010 | Gillig et al. | ............... 455/434 |
| 2008/0233991 | A1 | 9/2008 | Gillig et al. | |
| 2009/0196180 | A1 | 8/2009 | Bahl et al. | |
| 2009/0253376 | A1 | 10/2009 | Parssinen et al. | |

FOREIGN PATENT DOCUMENTS
WO   WO 2009115957   9/2009

OTHER PUBLICATIONS

Misic J. et al., "Sensing After Transmission in Cognitive Wireless Personal Area Networks", Communications Workshops, 2009. ICC Workshops 2009. IEEE International Conference, IEEE Piscataway, N.J., USA, Jun. 14, 2009, pp. 1-5.
Yucek T. et al., "A Survey of Spectrum Sensing Algorithms for Cognitive Radio Applications," IEEE Communications Surveys, IEEE, New York, NY, US, vol. 11, No. 1, Jan. 1, 2009, pp. 116-130.
Suoranta R ed—Kamala et al: "New Directions in Mobile Device Architectures", Digital System Design: Architectures, Methods and Tools, 2006, DSD 2006, 9th Euromicro Conference on, IEEE, PI, Jan. 1, 2006, pp. 17-26.
European Search Report for European Application No. 11152900.4-2412, dated Jun. 17, 2011, 13 pages.

* cited by examiner

*Primary Examiner* — Tuan H Nguyen
(74) *Attorney, Agent, or Firm* — Locke Lord LLP

(57) ABSTRACT

A system for configuring wireless communication in apparatuses based on sensed spectrum information. Apparatuses interacting via a shared information space may exchange configuration information that may, for example, comprise communication transport information. The configuration information may then be utilized in formulating spectrum sensing parameters that are distributed to one or more of the apparatuses via the shared information space. The spectrum sensing parameters may be used by the apparatuses for performing signals sensing operations in their respective environments, the results of which may be shared via the shared information space. The spectrum sensing results may then be utilized to configure and/or manage communications in one or more of the apparatuses.

17 Claims, 13 Drawing Sheets

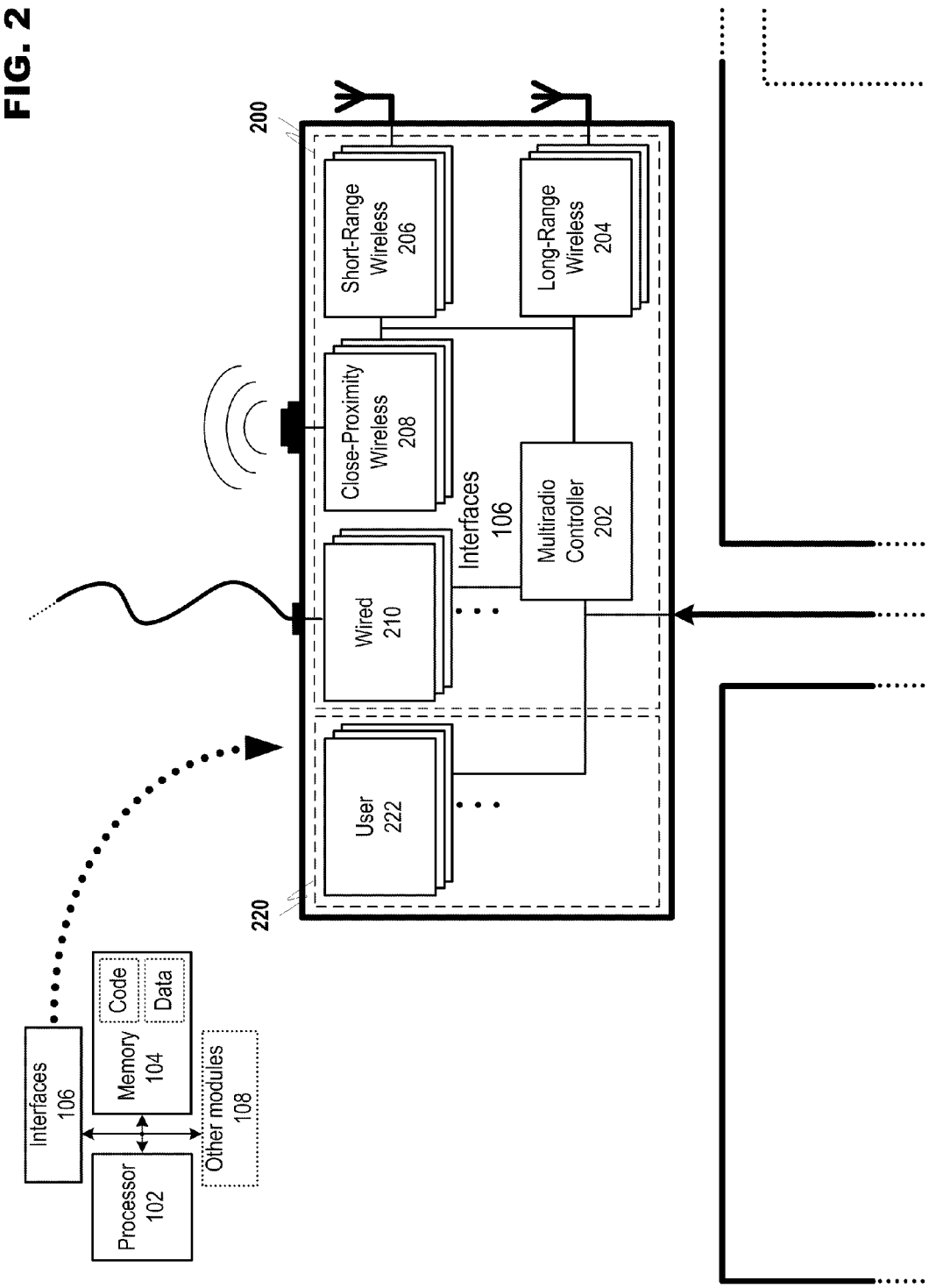

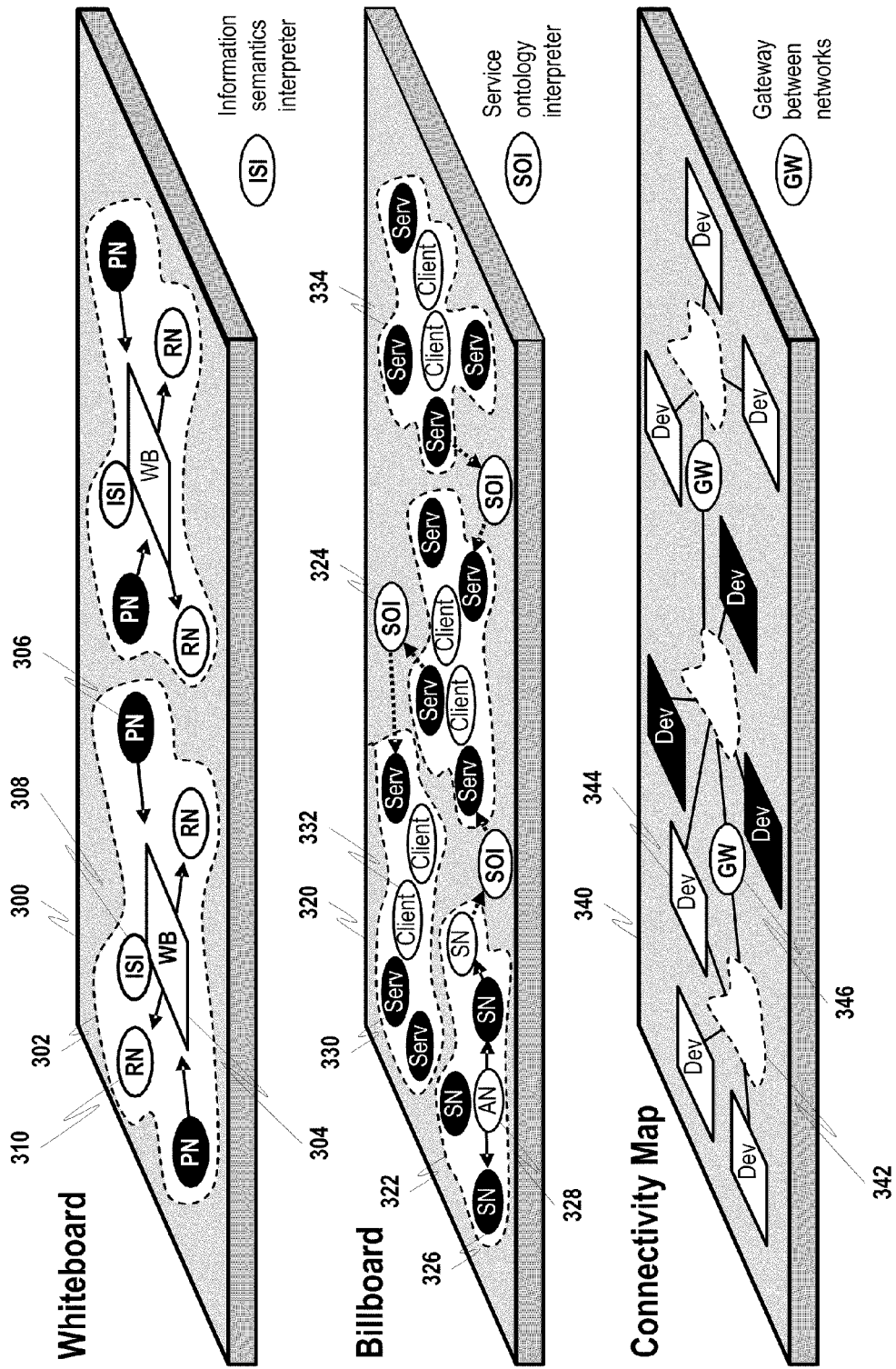

COLLABORATIVE SPECTRUM SENSING IN RADIO ENVIRONMENT

BACKGROUND

1. Field of Invention:

The present invention relates to wireless communication, and in particular, to configuring wireless communication in apparatuses based on sensed spectrum information.

2. Background:

Wireless communication is becoming prevalent in all aspects of modern society. The ability to communicate wirelessly has not only been implemented in obvious situations like mobile handsets, but has also made in-roads into scenarios that previously lacked any support for electronic communication, let alone wireless communication. Moreover, it is now possible for some wireless-enabled apparatuses to communicate using two or more wireless transports that are capable of being active at the same time. Being able to support multiple concurrent wireless signal streams from a single apparatus would, as a result, increase the already substantial number of wireless signal sources that may potentially be active at the same time to exponential levels.

The operation of so many signal sources may become problematic when confined to certain environments. For example, long-range wireless communication (e.g., cellular) may occur within frequencies that are licensed to specific service providers. While some burden due to overhead (e.g., cost and regulations) is inherent in these systems, the fact that these specific service providers more or less "own" the bandwidth means that they are able to effectively manage potential overload situations caused by heavy signal activity. Alternatively, apparatuses may also employ short-range wireless communication that operates in unregulated bandwidth. Operation in unregulated bandwidth may be attractive for many reasons. The power, speed and capacity characteristics of short-range wireless transports may make them more appropriate for many applications without the long-range overhead. However these beneficial characteristics may also make maintaining a minimum acceptable level of quality of service (QoS) difficult.

Unlicensed bandwidth may include many sources of signal activity. For example, where bandwidth is being reallocated from a more traditional use, such as in the case of proposed TV-band operations, some legacy wireless transmissions (e.g., television-related broadcasting) may continue to occur, and these legacy communications may be assigned a higher priority than any of the apparatuses utilizing the bandwidth as unregulated free space. In addition, electronic and electromechanical apparatuses such as large motors, high-power equipment, etc. may create interference signals in the same or nearby frequencies that may also impede wireless interaction. Adding to these existing signal sources a substantial amount of apparatuses that are attempting to utilize this same bandwidth in support of various short-range wireless interactions may result in interference, retransmission and the negation of any benefits from using unlicensed bandwidth.

SUMMARY

Example embodiments of the present invention may be directed to a method, computer program product, apparatus and system for configuring wireless communication in apparatuses based on sensed spectrum information. Apparatuses interacting via a shared information space may exchange configuration information that may, for example, comprise communication transport information. The configuration information may then be utilized in formulating spectrum sensing parameters that are distributed to one or more of the apparatuses via the shared information space. The spectrum sensing parameters may be used by the apparatuses for performing signals sensing operations in their respective environments, the results of which may be shared via the shared information space. The spectrum sensing results may then be utilized to configure and/or manage communications in one or more of the apparatuses.

In accordance with at least one embodiment of the present invention, a plurality of apparatuses may interact via a shared information space residing on one or more of the apparatuses. For example, the operation of the shared information space may be based on Network on Terminal Architecture (NoTA). Further, a cognitive radio (CR) component may be configured to manage interaction between the apparatuses that are participating in the shared information space, and may in this capacity receive configuration information from each of the plurality of apparatuses. The configuration information may at least identify the wireless transports supported by each apparatus. The CR component may utilize the wireless transport information to formulate spectrum sensing parameters for distribution to one or more of the plurality of apparatuses participating in the shared information space. For example, the spectrum sensing parameters may define a range of frequencies to sense and/or wireless transports to use in sensing for performing signal sensing operations in an apparatuses' respective environment.

After performing spectrum sensing based on the spectrum sensing parameters, the sensing apparatuses may provide spectrum sensing results information to the CR component via the shared information space. The spectrum sensing results may, in accordance with at least one embodiment of the present invention, be utilized to manage interactions between the plurality of apparatuses participating in the shared information space. For example, wireless transports may be selected for apparatus interactions based, at least in part, on their immunity to signals that were sensed in proximity to at least one of the apparatuses participating in the shared information space.

The foregoing summary includes example embodiments of the present invention that are not intended to be limiting. The above embodiments are used merely to explain selected aspects or steps that may be utilized in implementations of the present invention. However, it is readily apparent that one or more aspects, or steps, pertaining to an example embodiment can be combined with one or more aspects, or steps, of other embodiments to create new embodiments still within the scope of the present invention. Therefore, persons of ordinary skill in the art would appreciate that various embodiments of the present invention may incorporate aspects from other embodiments, or may be implemented in combination with other embodiments.

DESCRIPTION OF DRAWINGS

The invention will be further understood from the following description of various example embodiments, taken in conjunction with appended drawings, in which:

FIG. 2 discloses additional detail with respect to example communication interfaces that may be usable with various embodiments of the present invention.

FIG. 3 discloses example levels of a Network on Terminal Architecture (NoTA) in accordance with at least one embodiment of the present invention.

DESCRIPTION OF EXAMPLE EMBODIMENTS

Figure 1:
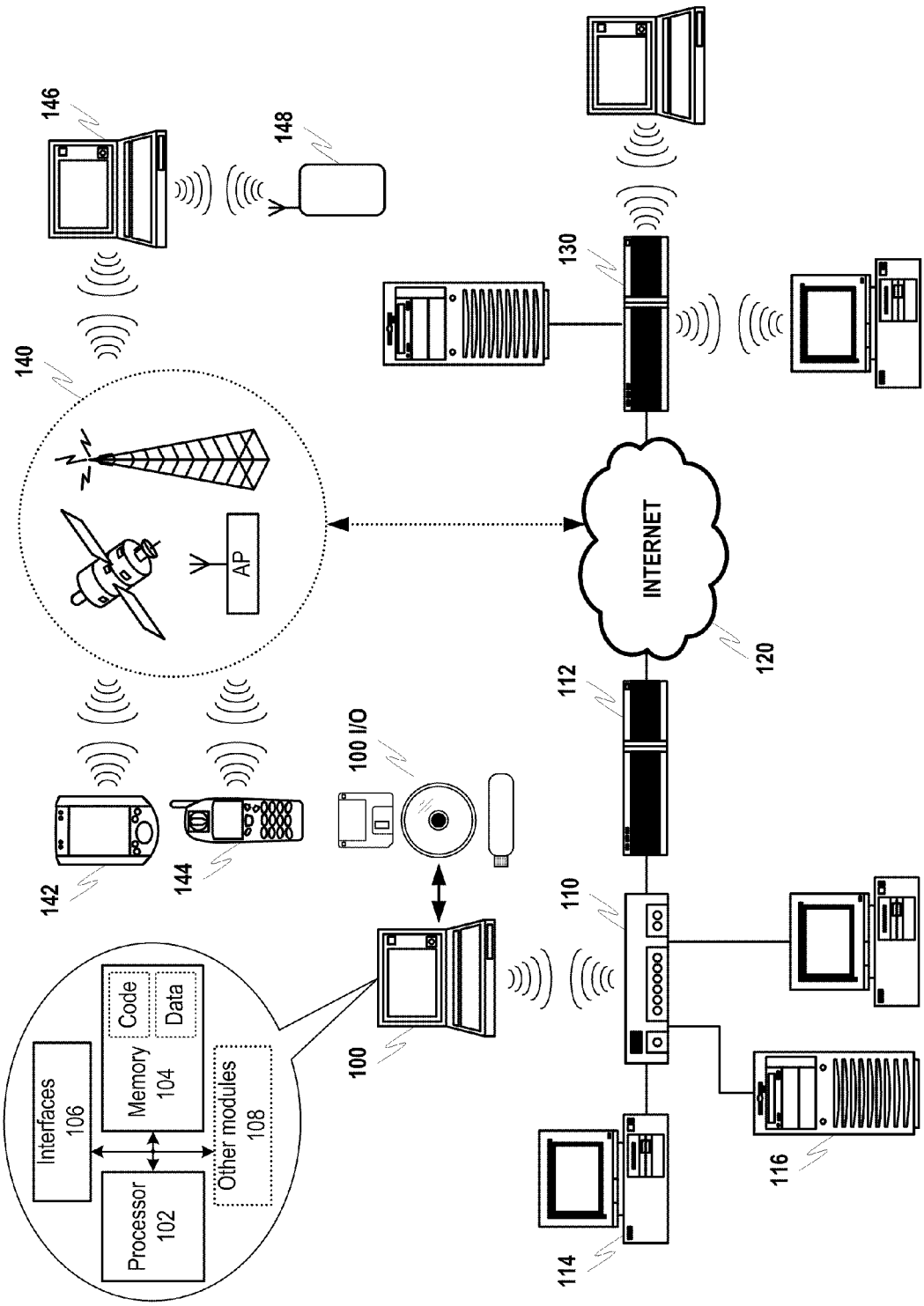
FIG. 1 discloses example apparatuses, communication configuration and network architecture usable in implementing at least one embodiment of the present invention.

While the invention has been described below in terms of a multitude of example embodiments, various changes can be made therein without departing from the spirit and scope of the invention, as described in the appended claims.

I. Example System with which Embodiments of the Present Invention May Be Implemented An example of a system that is usable for implementing various embodiments of the present invention is disclosed in FIG. 1. The system comprises elements that may be included in, or omitted from, configurations depending, for example, on the requirements of a particular application, and therefore, is not intended to limit present invention in any manner.

Computing device 100 may correspond to various processing-enabled apparatuses including, but not limited to, micro personal computers (UMPC), netbooks, laptop computers, desktop computers, engineering workstations, personal digital assistants (PDA), computerized watches, wired or wireless terminals/nodes/etc., mobile handsets, set-top boxes, personal video recorders (PVR), automatic teller machines (ATM), game consoles, or the like. Elements that represent basic example components comprising functional elements in computing device 100 are disclosed at 102-108. Processor 102 may include one or more devices configured to execute instructions. In at least one scenario, the execution of program code (e.g., groups of computer-executable instructions stored in a memory) by processor 102 may cause computing device 100 to perform processes including, for example, method steps that may result in data, events or other output activities. Processor 102 may be a dedicated (e.g., monolithic) microprocessor device, or may be part of a composite device such as an ASIC, gate array, multi-chip module (MCM), etc.

Processor 102 may be electronically coupled to other functional components in computing device 100 via a wired or wireless bus. For example, processor 102 may access memory 104 in order to obtain stored information (e.g., program code, data, etc.) for use during processing. Memory 104 may generally include removable or imbedded memories that operate in a static or dynamic mode. Further, memory 104 may include read only memories (ROM), random access memories (RAM), and rewritable memories such as Flash, EPROM, etc. Examples of removable storage media based on magnetic, electronic and/or optical technologies are shown at 100 I/O in FIG. 1, and may serve, for instance, as a data input/output means. Code may include any interpreted or compiled computer language including computer-executable instructions. The code and/or data may be used to create software modules such as operating systems, communication utilities, user interfaces, more specialized program modules, etc.

One or more interfaces 106 may also be coupled to various components in computing device 100. These interfaces may allow for inter-apparatus communication (e.g., a software or protocol interface), apparatus-to-apparatus communication (e.g., a wired or wireless communication interface) and even apparatus to user communication (e.g., a user interface). These interfaces allow components within computing device 100, other apparatuses and users to interact with computing device 100. Further, interfaces 106 may communicate machine-readable data, such as electronic, magnetic or optical signals embodied on a non-transitory computer readable medium, or may translate the actions of users into activity that may be understood by computing device 100 (e.g., typing on a keyboard, speaking into the receiver of a cellular handset, touching an icon on a touch screen device, etc.) Interfaces 106 may further allow processor 102 and/or memory 104 to interact with other modules 108. For example, other modules 108 may comprise one or more components supporting more specialized functionality provided by computing device 100.

Computing device 100 may interact with other apparatuses via various networks as further shown in FIG. 1. For example, hub 110 may provide wired and/or wireless support to devices such as computer 114 and server 116. Hub 110 may be further coupled to router 112 that allows devices on the local area network (LAN) to interact with devices on a wide area network (WAN, such as Internet 120). In such a scenario, another router 130 may transmit information to, and receive information from, router 112 so that devices on each LAN may communicate. Further, all of the components depicted in this example configuration are not necessary for implementation of the present invention. For example, in the LAN serviced by router 130 no additional hub is needed since this functionality may be supported by the router.

Further, interaction with remote devices may be supported by various providers of short and long range wireless communication 140. These providers may use, for example, long range terrestrial-based cellular systems and satellite communication, and/or short-range wireless access points in order to provide a wireless connection to Internet 120. For example, personal digital assistant (PDA) 142 and cellular handset 144 may communicate with computing device 100 via an Internet connection provided by a provider of wireless communication 140. Similar functionality may be included in devices, such as laptop computer 146, in the form of hardware and/or software resources configured to allow short and/or long range wireless communication. Further, any or all of the disclosed apparatuses may engage in direct interaction, such as in the short-range wireless interaction shown between laptop 146 and wireless-enabled apparatus 148. Example wireless enabled apparatuses 148 may range from more complex standalone wireless-enabled devices to peripheral devices for supporting functionality in apparatuses like laptop 146.

An example configuration of interface component 106 (shown as a component of computing device 100 in FIG. 1) is disclosed in FIG. 2. Initially, interfaces such as disclosed at 106 are not limited to use only with computing device 100, which is utilized herein only for the sake of explanation. As a result, interface features may be implemented in any apparatus that is disclosed in FIG. 1 (e.g., 142, 144, etc.) As previously set forth, interfaces 106 may include interfaces for both communicating data to computing apparatus 100 (e.g., as identified at 200) and other types of interfaces 220 including, for example, user interface 222. A representative group of apparatus-level interfaces is disclosed at 200. For example, multiradio controller 202 may manage the operation of long range wireless interfaces 204 (e.g., cellular voice and data networks), short-range wireless interfaces 206 (e.g., Bluetooth and WLAN networks), close-proximity wireless interfaces 208 (e.g., supporting interactions where electronic, magnetic, electromagnetic and optical information scanners interpret machine-readable data), wired interfaces 210 (e.g., Ethernet), etc. The example interfaces shown in FIG. 2 have been presented only for the sake of explanation herein, and thus, are not intended to limit the various embodiments of the present invention to utilization of any particular interface. Embodiments of the present invention may also utilize interfaces that are not specifically identified in FIG. 2.

Multiradio controller 202 may manage the operation of some or all of interfaces 204-210. For example, multiradio controller 202 may prevent interfaces that could interfere with each other from operating at the same time by allocating specific time periods during which each interface is permitted to operate. Further, multiradio controller 202 may be able to process environmental information, such as sensed interference in the operational environment, to select an interface that will be more resilient to the interference. These multiradio control scenarios are not meant to encompass an exhaustive list of possible control functionality, but are merely given as examples of how multiradio controller 202 may interact with interfaces 204-210 in FIG. 2.

II. Example Network on Terminal Architecture (NoTA)

As set forth above, embodiments of the present invention may employ a shared information space in which apparatuses may interact. In accordance with at least one embodiment of the present invention, the shared information space may comprise two or more apparatuses that share information at a certain location or in a certain situation. For instance, the expression "shared information space" may be used to indicate commonly understood and shared information in a certain situation or space. In accordance with at least one embodiment of the present invention, the shared information space may be made up of memory residing on one or more apparatuses, the memory being accessible to various apparatuses (including the one or more apparatuses) for use in supporting the exchange of information between the various apparatuses. The shared information space may be established based on a communication architecture, such as a Network-on-Terminal Architecture (NoTA). An example of such a communication architecture, in accordance with at least one embodiment of the present invention, is disclosed in FIG. 3. While the present invention may center mainly on Billboard 320 and Connectivity Map 340, Whiteboard 300 is also disclosed for contextual purposes. Whiteboard 300 may comprise the highest level of operation in this architecture. At this level, operational groups 302 may be formed including whiteboards 304 and various application nodes. Application nodes may correspond to applications existing on a plurality of apparatuses participating in a shared information space, and may be utilized to exchange information between the applications, for example, by placing data into, and removing data from, whiteboard 304. For example, the various nodes may consist of proactive nodes (PN) 306 that may be utilized to place information into whiteboard 304, reactive nodes (RN) 310 may be utilized to take information from whiteboard 304. Information semantics interpreter (ISI) 308 may be utilized to link different whiteboards together. Utilizing these constructs, Whiteboard 304 may provide a standardized means for application interaction that overcomes many incompatibilities.

Billboard level 320 may facilitate interaction between services available on the apparatuses participating in a shared information space. For instance, Billboard level 320 may enable the sharing of service-related information (e.g., service identification information, functionality, etc.), as well as any information that may be necessary in order to access and/or utilize each service. Services 330 and clients 332 that may utilize these services may be organized in service domains 322. In at least one scenario, service domains 322 may correspond to a particular protocol, such as Universal Plug and Play (UPnP), Bluetooth™ Service Discovery Protocol (BT SDP), Bonjour, etc. In each service domain 322, services 330 may be represented by service nodes (SN) 326, and likewise, application nodes (AN) 328 may be established to correspond to applications. Further, service domains 322 may interact utilizing service ontology interpreters (SOI) 324. SOI 324 may allow service domains 322 to interact with other service domains 322 in the service level, even if the service domains 322 reside on different wirelessly-linked devices (e.g., to provide access information to other service domains 322).

Connectivity map 340 may define available connectivity methods and topology for the apparatuses participating in the shared information space (e.g., supporting whiteboard 300 and billboard 320). In at least one embodiment of the present invention, devices 344 may be linked in directly connected groups 342. Examples of directly connected device (Dev) groups 342 may include devices connected via Bluetooth™ piconet, a WLAN network, a wUSB link, etc. Each directly connected group of devices 342 may further be linked by gateways (GW) 346.

III. Example Underlying Architecture

In accordance with various embodiments of the present invention, a service may be defined as functionality offered or derived from a particular software program. Services may pertain to all aspects of apparatus functionality. Services may be provided, for example, by an apparatus operating system, or may be added to the apparatus by accessory applications related to communication, security, productivity, device resource management, entertainment, etc. For example, a shared information space may contain one or more service nodes that represent services that are available from apparatuses participating in the shared information space.

Figure 4A:
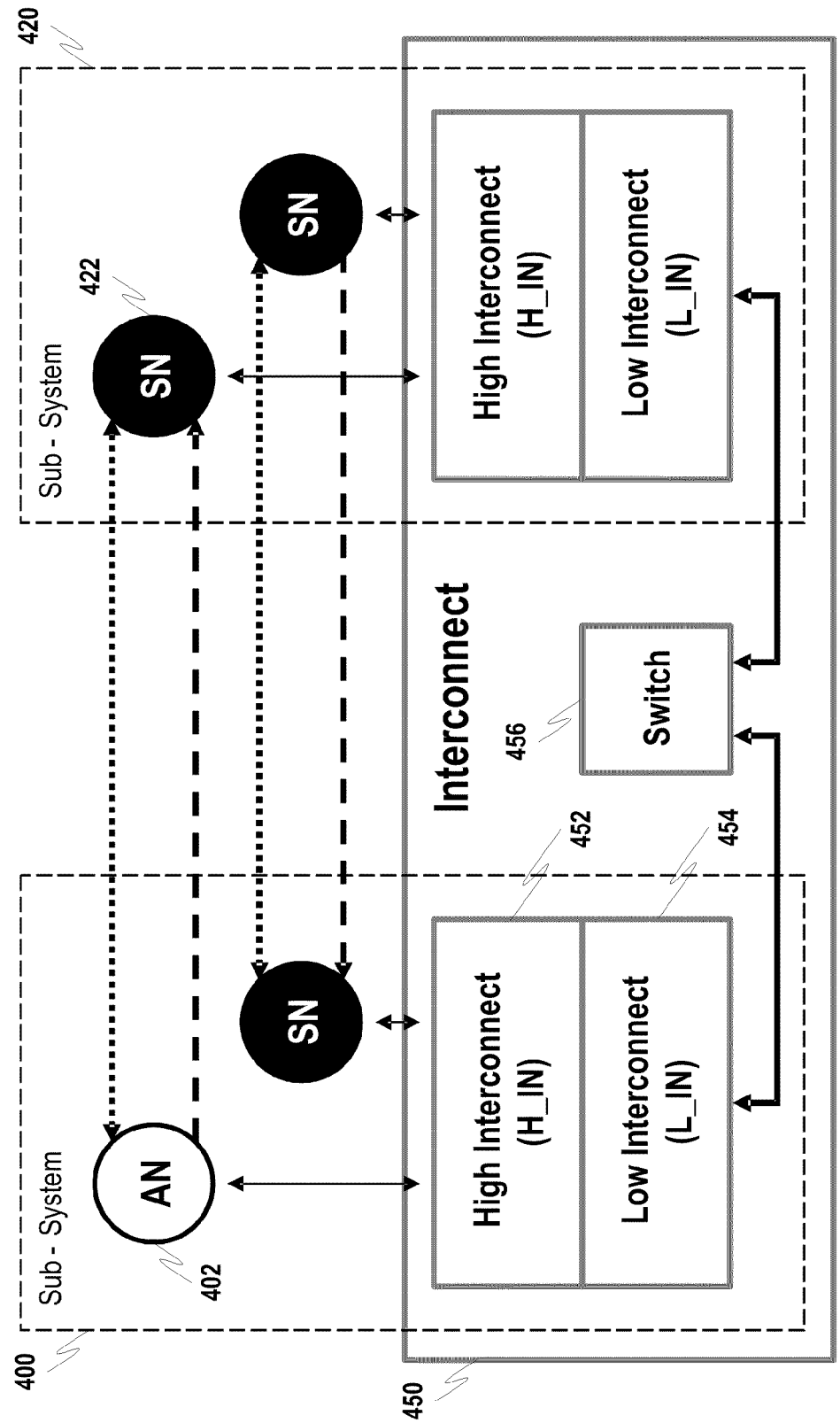
FIG. 4A discloses example underlying constructs of a Network on Terminal Architecture (NoTA) in accordance with at least one embodiment of the present invention.

In order to provide access to services such as described above, communication environments like NoTA must provide an underlying communication structure that facilitates this interaction. FIG. 4A discloses an example of an underlying logical architecture that may be utilized when implementing NoTA. NoTA may be configured as multiple subsystems (e.g., 400 and 420) coupled by interconnect 450. NoTA interconnect 450 may comprise two layers: High Interconnect (H_IN) layer 452 and Low Interconnect (L_IN) layer 454 coupled by switch 456. Low interconnect layer 454 may include ISO/OSI layers L1-L4 and may provide transport socket type interface upwards. High Interconnect layer 452 may act as the middleware between L_IN 454 and the higher level Application nodes (AN) 402 and Service nodes (SN) 422 residing in subsystems like 400 and 420. H_IN 452 may function by providing client nodes (AN 402 or SN 422) on top with direct access to services (without having to disclose the location of the latter). Communication may be connection-oriented, meaning that before any service or data communication takes place, connection setup procedures may need to be carried out. Security features have been added to countermeasure the identified threats. NoTA is an architecture that may be used to provide intra-apparatus service access, making it possible to build independent subsystems providing both services and applications. In an example implementation there may be several individual NoTA devices involved in direct inter sub-system communication.

Figure 4B:
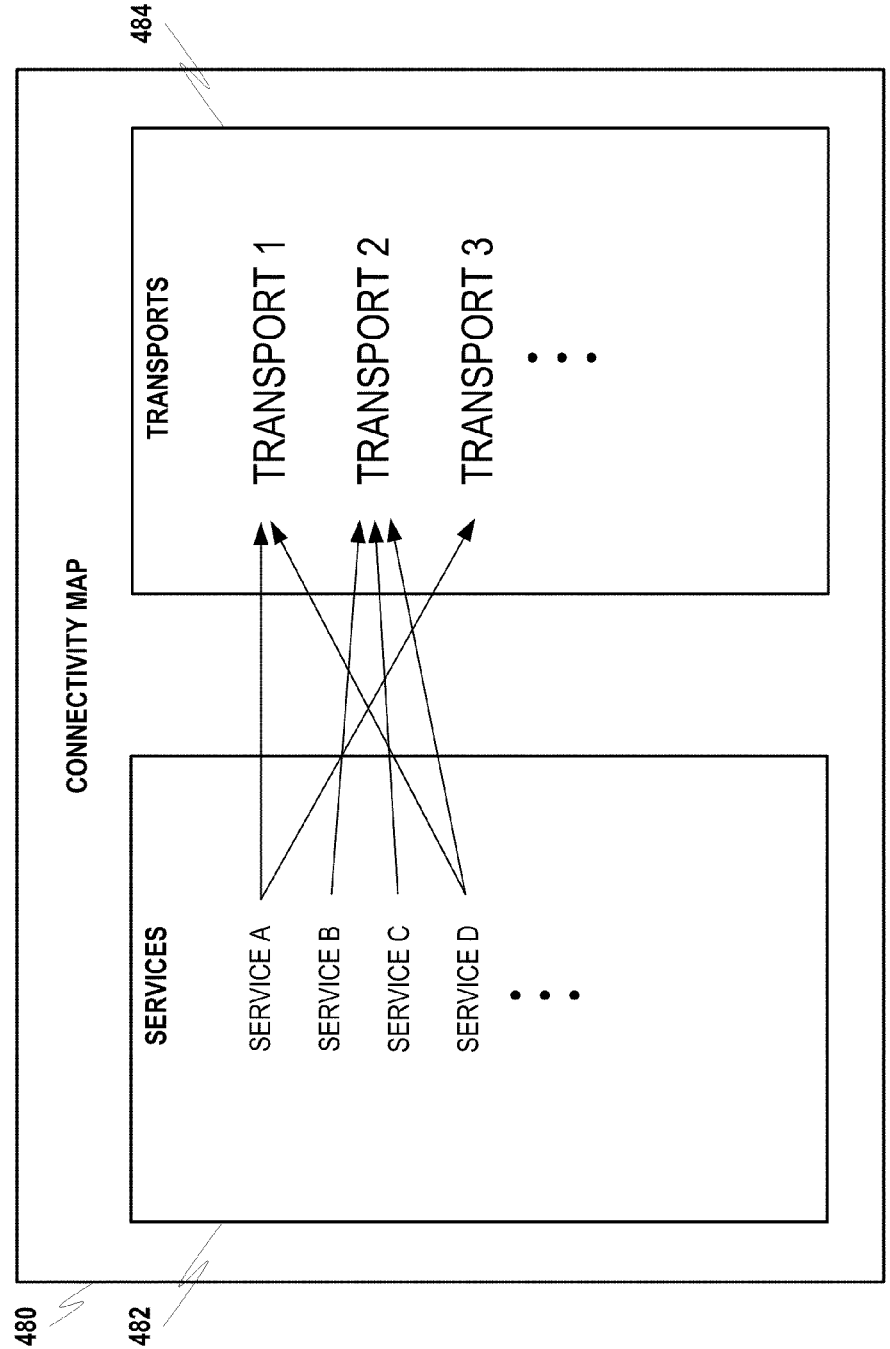
FIG. 4B discloses an example transport table of a Network on Terminal Architecture (NoTA) in accordance with at least one embodiment of the present invention.

FIG. 4B discloses another underlying construct that may be implemented in accordance with various embodiments of the present invention. Connectivity map 480 may be utilized to map the various services offered on the apparatuses participating in billboard table 300 to various transport mediums that may be utilized with each service. In the present example, transport mediums may comprise wireless transports such as Bluetooth, WLAN, Bluetooth Low Energy (Bluetooth LE), wUSB, etc. In addition, the present invention, in accordance with at least one embodiment, may also use radio technologies with several protocols (e.g., Bluetooth protocols may be implemented over WLAN). However, the present invention is not specifically limited to using these particular wireless communication mediums, and may be implemented with other wireless communication mediums that are usable by services offered the participating apparatuses. In this example, services offered by the devices may be listed under services 482, and the corresponding available transport mediums are listed under transports 484. Arrows between services 482 and transport mediums 484 indicate the transport mediums that are usable by each service. The information in connectivity map 480 may, in accordance with various embodiments of the present invention, create a binding between billboard table content (e.g., service offerings) and connectivity map table content (e.g., available device connectivity configurations) so that this information may be utilized, for example, by applications in determining an appropriate transport medium to utilize with a particular service. Where two or more transport mediums are available, a particular transport medium may be selected based on various characteristics such as speed, traffic, priority of executing the service, other active wireless communication mediums, etc.

IV. Operational Example

Figure 5:
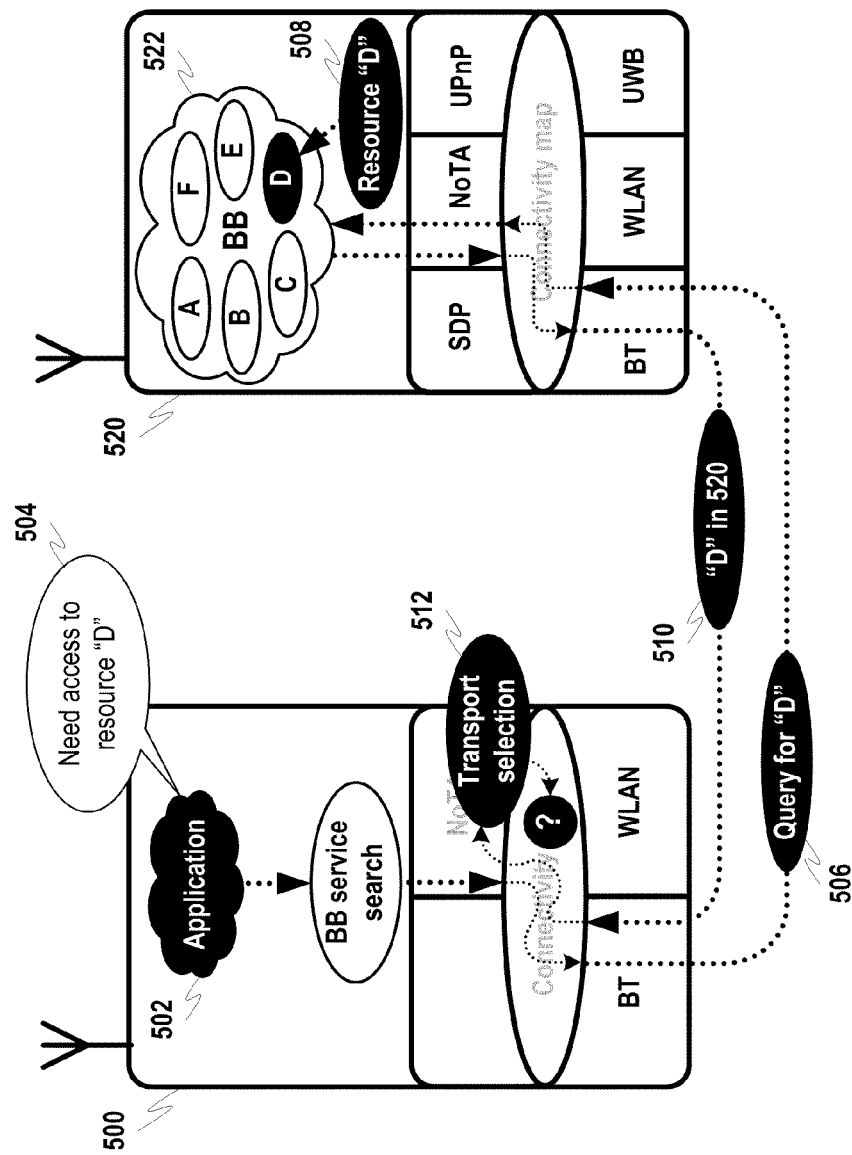
FIG. 5 discloses an example operational scenario wherein apparatuses are interacting in accordance with at least one embodiment of the present invention.

In accordance with at least one example implementation, FIG. 5 discloses a possible interaction between apparatuses 500 and 520. While only two apparatuses have been disclosed in FIG. 5 for the sake of explanation herein, the present invention is not limited to use with only two apparatuses. Interaction in this scenario may be initiated by any participating apparatus, but in the disclosed example is triggered by application 502 in apparatus 500. Application 502 may be, for example, a software/program module that upon activation, execution or user interaction creates requirements to access a resource (e.g., as shown at 504).

In accordance with the previously disclosed example embodiments of the present invention, BB search 500 may utilize a transport, such as Bluetooth™ (BT), to perform queries 506 of available resources in the NoTA environment. The same transport may further be used to exchange connectivity map information, which may eventually be utilized in transport selection 512 when appropriate transports are to be selected. The accumulation of this available resource information may help facilitate the identification of potential providers for requested resources, such as resource "D" requested by application 502. For example, information in BB 522 may disclose that resource "D" 508 actually resides on apparatus 520 in the NoTA environment, and therefore, apparatus 520 is able to act as a "provider" for resource "D" to apparatus 500.

A response 510 to inquiry 506 may then be sent identifying one or more potential resources (e.g., services, databases, etc.) residing on at least one provider (in this case apparatus 520). However, subsequent transactions cannot be limited to utilizing the transport that was initially selected in order to perform the query. For example, high speed, low power, low throughput transports like Bluetooth LE may be adequate for performing initial queries, but would not be likewise appropriate for subsequent communication if large amounts of data are to be conveyed, a low amount of errors is required or other similar requirement exist.

V. Example of Cognitive Radio (CR) Components

The example interaction disclosed in FIG. 5 demonstrates the substantial effect of communication configuration when attempting to achieve an acceptable quality of service (QoS) level. However, FIG. 5 does not explain how these apparatuses may arrive at such "optimized" configurations. In accordance with at least one embodiment of the present invention, FIG. 6 discloses an example of system that may be utilized to coordinate communication configuration for some or all apparatuses (e.g., apparatuses A to C) interacting via shared information space 600, which is divided in FIG. 6 into segments/areas 600A, 600B and 600C. For example, a system may be implemented to help regulate inter-apparatus communication by making communication configuration information available to the apparatuses via entities (e.g., services) residing in the shared information space.

Figure 6:
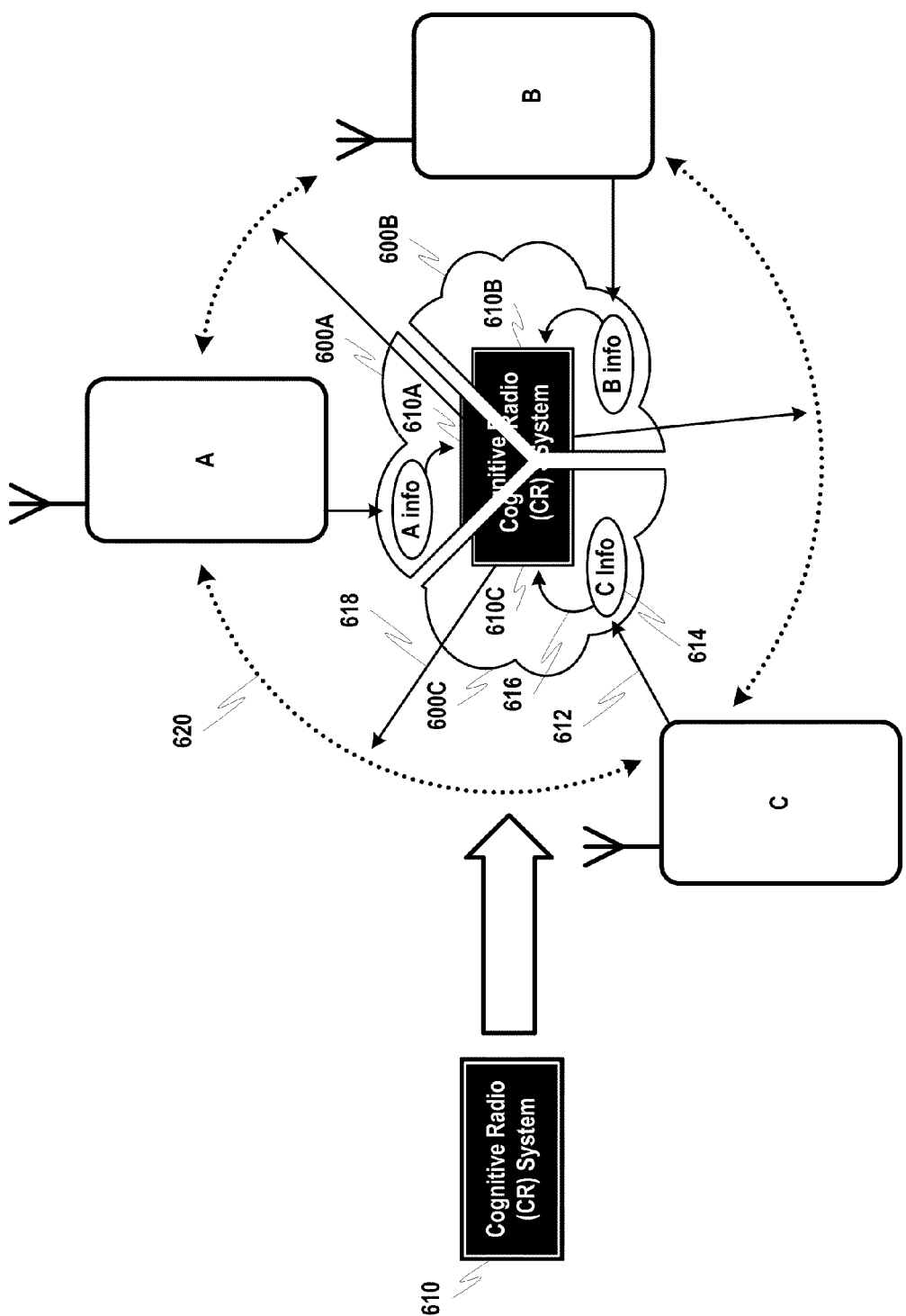
FIG. 6 discloses an example of cognitive radio (CR) components in accordance with at least one embodiment of the present invention.

An example implementation of a Cognitive Radio (CR) system 610 is disclosed in an example distributed arrangement in FIG. 6. More specifically, portions of CR 610 (e.g., 610A to C) may exist in shared information space sections 600A to 600C residing on apparatuses A to C, respectively. However, the various example embodiments of the present invention are not specifically limited to the disclosed system, which has been provided for the sake of example herein. For example, CR system 610 may reside completely in the shared information space section of a single apparatus. Some or all of the apparatuses may provide information 612 to their respective shared information space sections 600A to 600C, an example of which is shown at 614. Information 614 provided by apparatuses A-C may be conveyed (as shown at 616) to CR system 610, which may utilize information 614 to formulate communication configuration information pertaining to some or all of apparatuses A-C. Communication configuration information may comprise, for example, one or more preferred configurations for each apparatus or information usable by apparatuses A-C in formulating their own configuration. Configuration information 618 may then be made available to apparatuses A-C to help facilitate the configuration of inter-apparatus communication 620.

Figure 7:
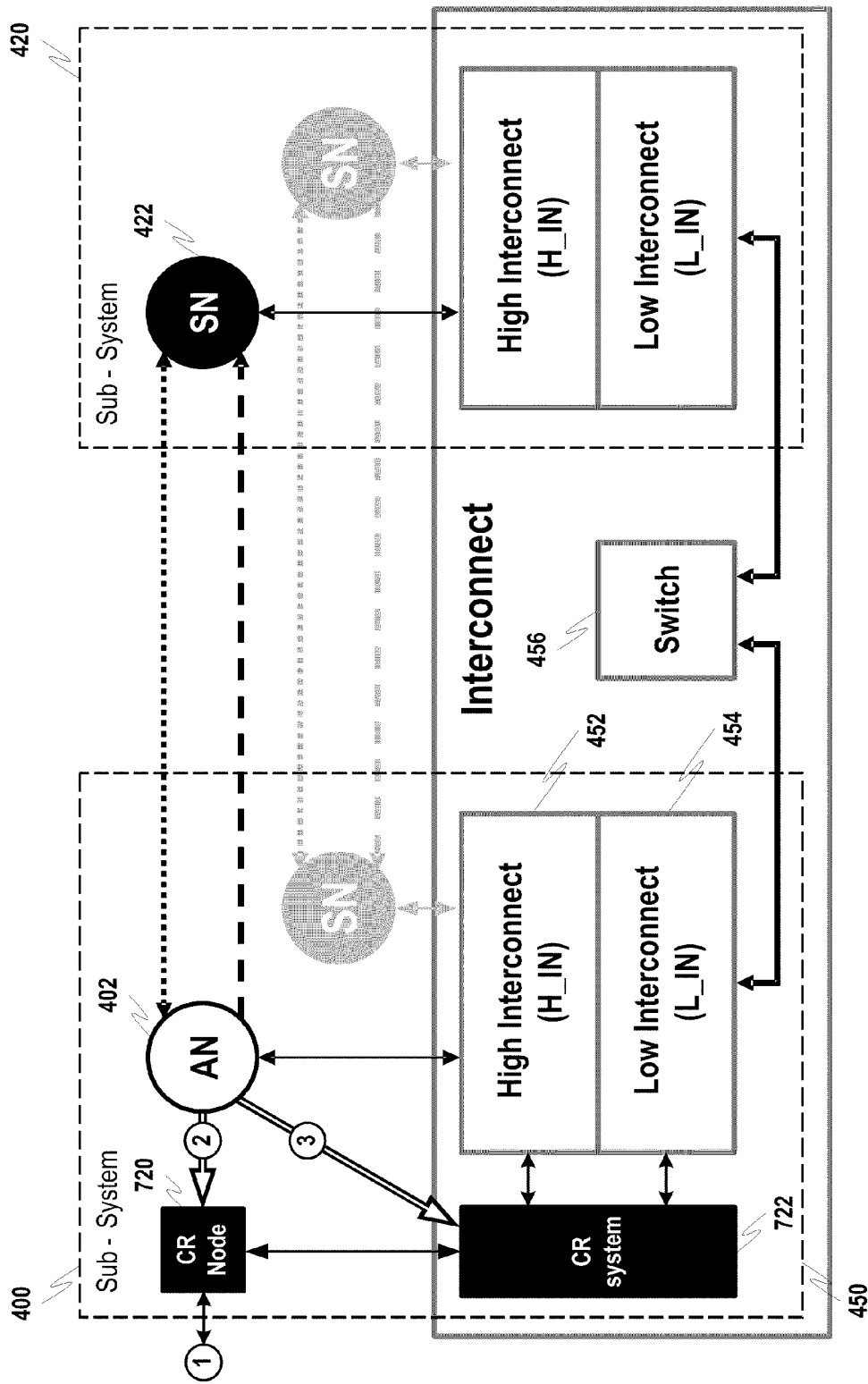
FIG. 7 discloses an example integration of cognitive radio (CR) components into a Network on Terminal Architecture (NoTA) wherein applications may interact directly with the CR components in accordance with at least one embodiment of the present invention.

FIG. 7 discloses an example integration of CR system 610 into NoTA in accordance with various example embodiments of the present invention. CR system 610 may comprise CR node/service element 720, which may correspond to services provided by system-level element 722. CR-node/service 720 may be utilized to provide configuration information between devices, such as between two CR nodes which is represented by ① in FIG. 7. Generally CR-node/service 720 may exchange configuration information and CR system-level element 722 may provide access rules corresponding to certain transport techniques. Application level entities may provide detailed requirements (e.g., minimum QoS) for certain connections directly to CR-node/service 720, which is represented by ② in FIG. 7, or alternatively, through direct interaction with CR system-level element 722, which is represented by ③ in FIG. 7.

It is also possible for activities performed by CR system 610 to be transparent to upper-level entities. In this way, applications may simply specify the type of connection needed and may then rely on lower level control resources to establish a connection having the required characteristics. An example of this transparency is disclosed in FIG. 8. AN 402 may interact with H_IN 452 in a manner similar to NoTA systems that do not include CR functionality. Part of this interaction may include the specification of required operational parameters for the requested connection as shown at ④ in FIG. 8. Upon receiving these requirements, L_IN 454 may provide the requirements to, and receive configuration information from, CR system-level element 722, which may be used to establish a connection. As further disclosed in FIG. 8, CR node 720 may still exist in order to convey configuration information between devices.

Figure 8:
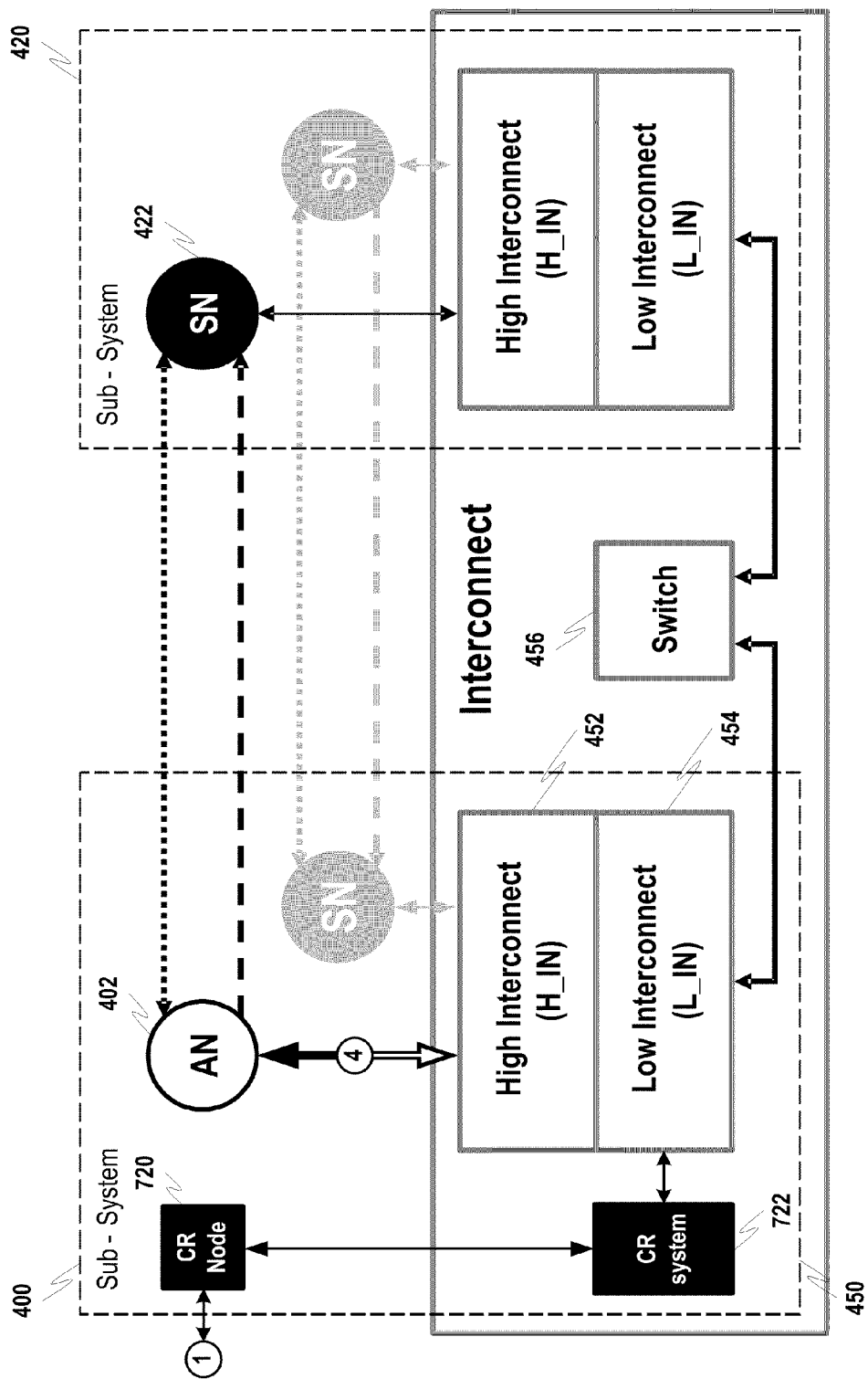
FIG. 8 discloses an example integration of cognitive radio (CR) components into a Network on Terminal Architecture (NoTA) wherein CR component activity may be transparent to application level entities in accordance with at least one embodiment of the present invention.

In accordance with either of the example CR system implementations disclosed in FIG. 7 or 8, CR system-level element 722 may provide access to various types of information. For example, CR system-level element 722 may provide one or more preferred communication configurations (e.g., particular transports, modes of operation, etc.) or other information that may be usable by apparatuses in formulating their own communication configuration. Alternatively CR system-level element 722 may indicate that a desired interaction scenario is not currently possible/permitted based on the accumulated configuration information.

Figure 9:
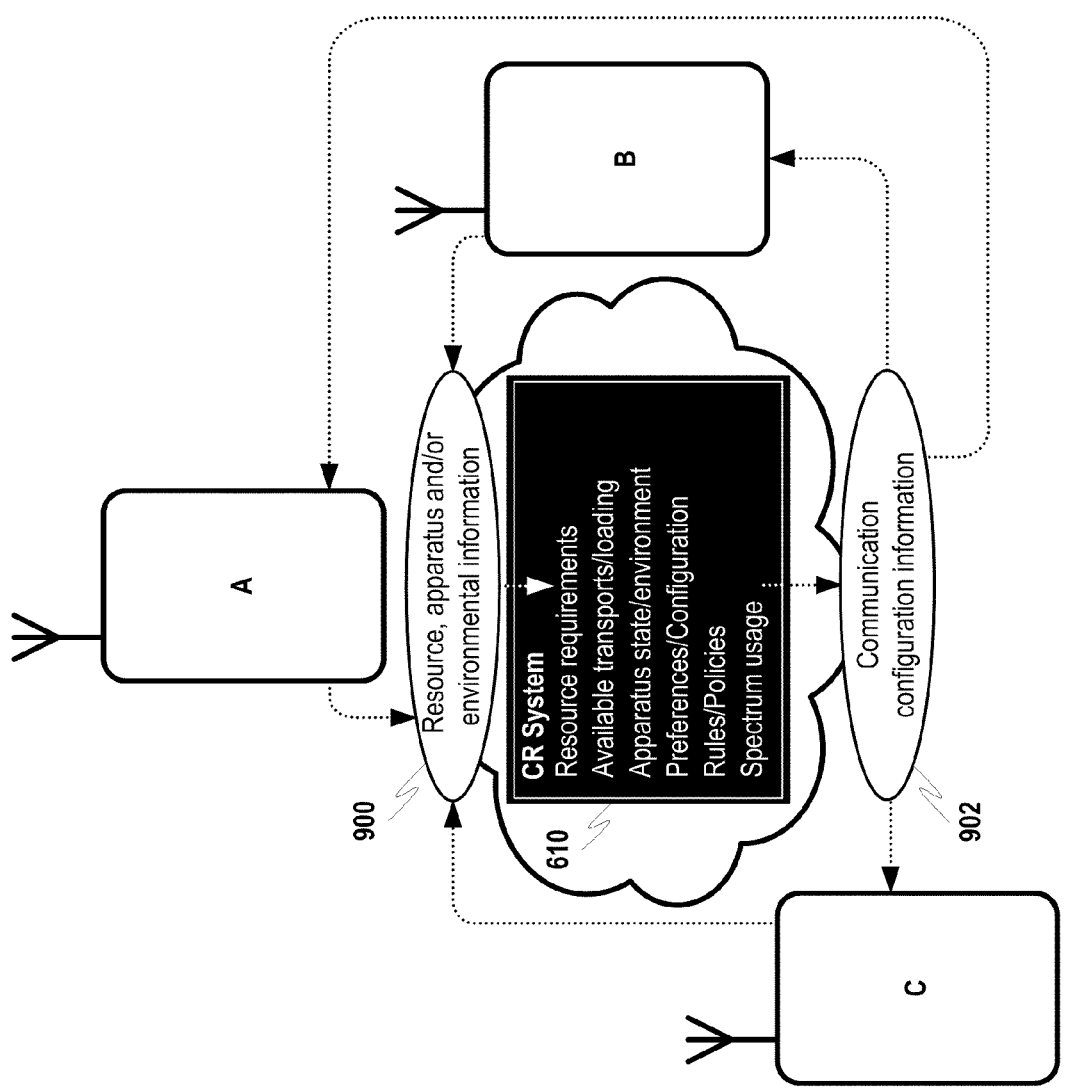
FIG. 9 discloses an example of communication configuration in accordance with at least one embodiment of the present invention.

In accordance with at least one embodiment of the present invention, FIG. 9 discloses an example methodology used by CR system 610 in formulating communication configuration information. Initially decision criteria may be provided at 900, the decision criteria comprising resource, apparatus and/or environmental information. Examples of resource information may include, but are not limited to, applications and/or services residing on an apparatus, hardware components available to an apparatus (e.g., sensors, image capture devices like cameras, etc.), data stored on apparatuses, etc. Example apparatus information may comprise communication transports that are supported in an apparatus, security measures in an apparatus and information pertaining to the current operating condition of an apparatus (e.g., power level, active transports and corresponding traffic/pending messages for each, processor loading, etc.). Environmental information may encompass information obtained by apparatuses regarding the environment in which the apparatus is operating including, for example, a current state of the transmission spectrum local to each apparatus or the indication of potential sources of interference. Potential sources of interference may be identified based on field sensors within the apparatus, packet loss experienced in communications over particular wireless transports, etc.

The example decision criteria disclosed at 900 may be supplied to CR system 610 in response to a request message, may be provided periodically based on a predetermined time period, in response to changes occurring in the apparatuses, etc. CR system 610 may utilize the received decision criteria in one or more logical determination steps as shown in FIG. 9. For example, CR system 610 may consider the decision criteria in view of resource requirements such as communication link performance requirements (e.g., high speed and/or capacity for multimedia streaming), link security requirements for accessing private and/or sensitive information, etc. CR system 610 may further consider which communication transports are available and the loading of each of these transports system-wide and the current state and/or environmental conditions corresponding to each apparatus. Apparatuses that have limited power and/or processing resources may be slated for communication using transports that help to conserve these resources. Further, apparatuses experiencing interference based on locally active transports or proximately-located sources of interference may limited to using transports that are immune to these types of interference. Preferences/configuration may comprise non-condition or non-environmental provisions that control transport selection. For example, users may configure WLAN over high-speed cellular transports to improve wireless application performance, certain transports may be designated as always having priority (e.g., transports carrying voice data), etc. Rules/Policies may comprise, for example, regulatory rules that the nodes need to follow in their utilization of spectrum. Spectrum usage may further be utilized to determine the frequency spectrums that are preferred (or should be avoided) when establishing new communication links.

The culmination of the example logical decision steps shown in FIG. 9 may take the form of communication configuration information 902. This information may be provided in various formats, such as possible communication configurations that may be adopted by an apparatus. For example, possible communication configurations may comprise assigning one or more communication transports (e.g., low power) for use in accessing a certain apparatus. Requesting applications and/or required resources may also dictate the selection of transports having specific speed, capacity, error-correction, security characteristics, etc. Further, transports may be excluded from configurations used to access certain apparatuses based on the potential negative impact of interference sources that are local or proximately-located to the apparatus.

In accordance with at least one example embodiment of the present invention, it is also possible for communication configuration information to consist of data that is usable when apparatuses are configuring their own communications. For example, communication transports supported by an apparatus, encryption or error-checking functionality available in an apparatus, local interference information and/or local spectrum utilization information, apparatus condition information, etc. may be made available to other apparatuses that desire to access resources on the apparatus. The other apparatus may then formulate its configuration in view of the abilities and/or limitations of the apparatus to which communication is desired. In either situation (e.g., the provision of possible configurations or information usable by apparatuses when configuring a link), the configuration information may be accessed by requesting apparatuses (e.g., such as by the apparatuses querying configuration data stored in a particular format), may be provided in one or more messages transmitted from CR system 610 in response to apparatus requests, etc.

Figure 10:
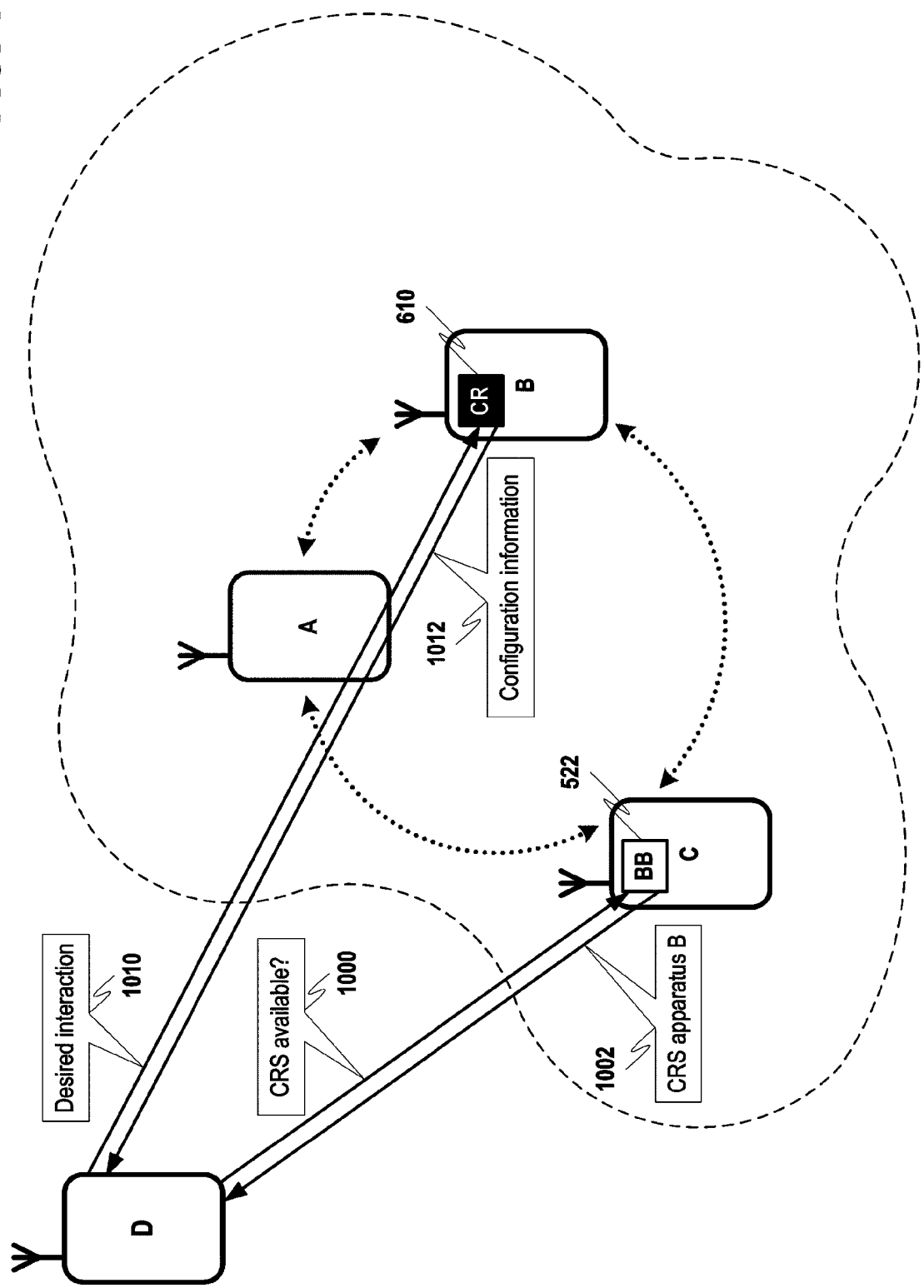
FIG. 10 discloses an example of inter-apparatus communication in accordance with at least one embodiment of the present invention.

In accordance with various example embodiments of the present invention, an example implementation scenario is disclosed in FIG. 10. Apparatus D may desire to participate in a shared information space currently including apparatuses A-C. Apparatus D may initially interact with billboard 522 (or a portion of billboard 522) residing on apparatus C. This communication may comprise two activities. First, apparatus D may query billboard 522 (in accordance with the previously described example embodiments) to locate a required resource. Billboard 522 may accordingly provide potential resource providers and/or the apparatuses on which they reside. Second, as shown in FIG. 10 apparatus D may inquire as to whether a CR system is available at 1000. At least one CR component of CR system 610 resides on apparatus B in the disclosed scenario, and so billboard 522 may inform apparatus D as such at 1002.

Apparatus D may then interact with CR system 610. In accordance with at least one example embodiment of the present invention, apparatus D may query CR system 610 in view of the desired interaction (e.g., accessing a resource provider on a certain apparatus) at 1110. This activity may be accomplished by querying configuration information stored by CR system 610, sending a request message from apparatus D to CR system 900, etc. Regardless of the manner by which access takes place, CR system 610 may provide configuration information (or alternatively may inform apparatus D that access to the resource/apparatus is currently not available). Apparatus D may utilize any communication configuration information provided to establish a link to an apparatus that is capable of providing access to the required resource.

VI. Further Examples of Spectrum Sensing

As disclosed in the example embodiment of FIG. 10, apparatus D may provide information to CR system 610 upon joining the shared information space. In accordance with at least one example embodiment of the present invention, this initial interaction may include providing communication configuration information to CR system 610. Configuration information may, for example, comprise information identifying the communication transports that are supported by apparatus D. CR system 610 may utilize this information configuring communication within the shared information space, and in some instances, may use this information to "customize" spectrum sensing in one or more of the apparatuses.

Spectrum sensing as input to communication configuration was already discussed with respect to the example embodiment of FIG. 9. In particular, apparatuses may perform spectrum sensing operations to collect information on potential sources of interference that may exist proximate to apparatuses participating in the shared information space. However, these apparatuses must expend resources in order to perform such spectrum sensing, and the information collected by the apparatuses may, in some instances, not be useful to CR system 610 when configuring communications in that the signals sensed by the apparatuses may be in a totally different spectrum that the usable wireless transports. As a result, spectrum sensing may consume resources while offering little value, which may negatively impact overall performance at both the device-level and the system-level.

In accordance with at least one embodiment of the present invention, the spectrum sensing performed by apparatuses in the shared information space may be customized by CR system 610 in order to, for example, conserve apparatus resources, accumulate more relevant spectrum information for evaluation in CR system 610, etc. As discussed in regard to the example embodiment of FIG. 10, apparatus D may provide communication configuration information to CR system 610 at instances such as when the apparatus joins the shared information space. CR 610 may use this information to control how spectrum sensing is performed by apparatuses A, C and D. For example, if configuration information reveals that only a few wireless transports are supported by these apparatuses, then CR 610 may configure spectrum sensing based on one or more of these wireless transports.

CR 610 may evaluate the configuration information provided by the apparatuses participating in the shared information space and may formulate spectrum sensing parameters based on this information. Example configuration information that may be provided to CR 610 may include one or more of apparatus configuration information (e.g., spectrum sensing features available in each apparatus), apparatus condition information (e.g., energy level, processing load, message traffic level, etc.), identification of transports supported in each apparatus, the supported transports that are currently in use in each of the apparatuses (e.g., channel usage information), etc. This information may be used as an input by CR 610 when formulating spectrum sensing parameters. In accordance with at least one embodiment of the present invention, CR 610 may have an objective of comprehending signal activity occurring in some or all of the operational environment based on, for example, communication activities that are planned between various apparatuses that are participating in shared information space 600. In this regard, CR 610 may identify apparatuses in certain regions of the operational environment that can perform sensing for particular signal activity, and may then assign spectrum sensing tasks to these apparatuses. For example, assignments may be affected by the spectrum sensing features that are available in each apparatus. If multiple apparatuses are operating in the same location, apparatuses having more spectrum sensing ability may be assigned more or all of the spectrum sensing tasks. Similarly, apparatuses that have limited resources available (e.g., apparatuses in a low power condition) may have some or all of their spectrum sensing tasks assigned to other apparatuses. Apparatuses that are actively utilizing certain transports may be excluded from spectrum sensing tasks where usage of the in-use transports during spectrum sensing may be advantageous or even necessary. As a result, an overall spectrum sensing strategy for the operational environment may be implemented by CR 610 through the configuration of one or more apparatuses in accordance with spectrum sensing parameters that CR 610 may distribute to the one or more apparatuses.

Figure 11:
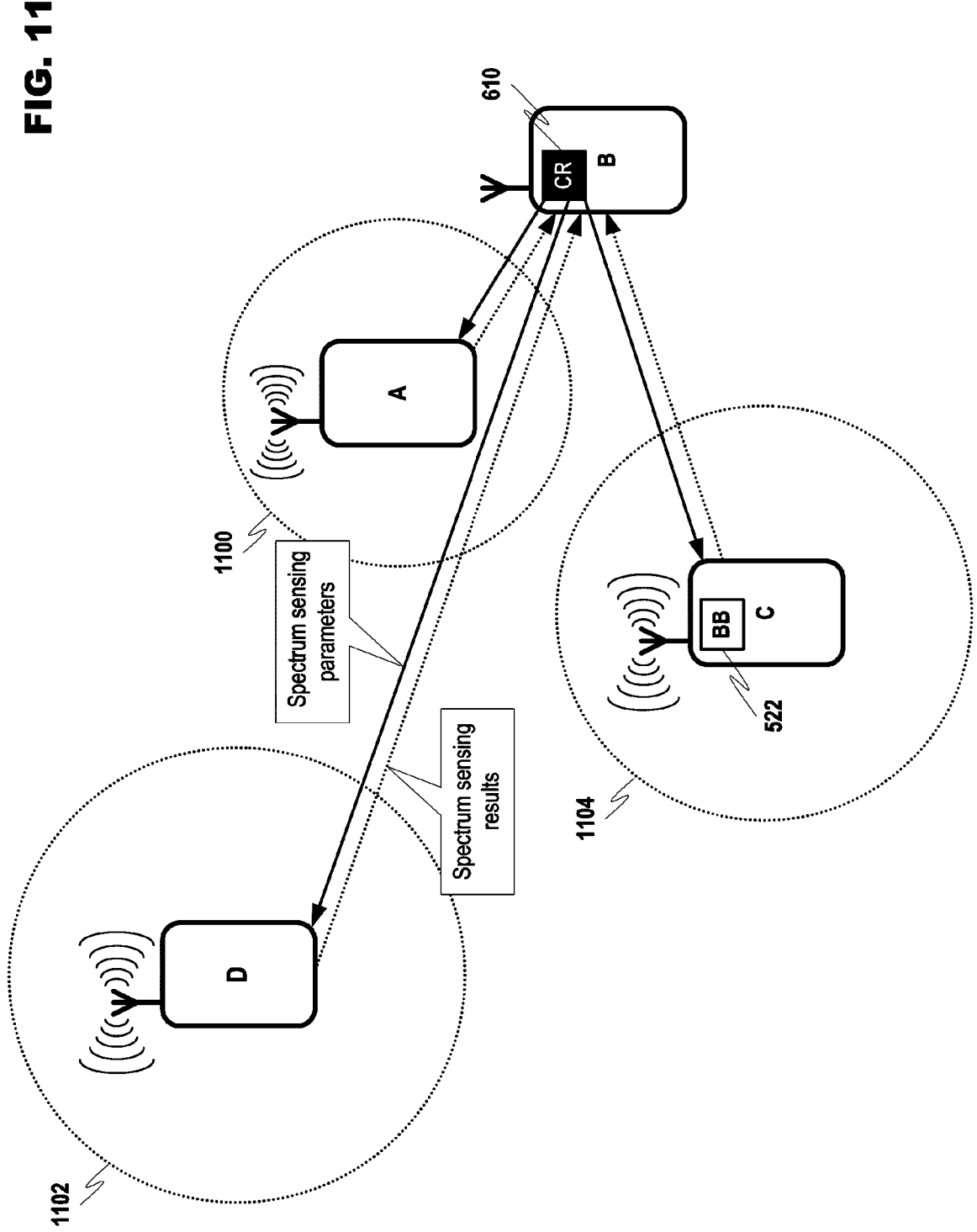
FIG. 11 discloses an example of communicating spectrum sensing configuration and results information in accordance with at least one embodiment of the present invention.

In FIG. 11, the example operational scenario of FIG. 10 is further developed to include the provision of spectrum sensing parameters to each of apparatuses A, C and D, according to one embodiment of the present invention. The spectrum sensing parameters may comprise information usable by the receiving apparatuses for customizing how spectrum sensing is performed. For example, apparatus A, C and D may each have proximate operational environments 1100, 1102 and 1104, respectively. Spectrum sensing parameters may provided to one or more of these apparatuses, and the apparatuses may receive the same parameters or the parameters may be particular to each of these environments. How the spectrum sensing parameters are distributed may depend on a variety if factors. For example, if one of the apparatuses is communicating via a long-range wireless transport, the distance of the apparatus from the other apparatuses participating in the shared information space may make short-range wireless signal sensing proximate to the apparatus irrelevant to system operation. Further, a range of frequencies to sense and/or a particular wireless transport to utilize in sensing may be identified in the spectrum sensing parameters. Such limitations on sensing may "tune" sensing operations in apparatuses to identify only those signals that may potentially cause interference.

As shown in the example embodiment of FIG. 11, one or more of the apparatuses A, C or D may receive the spectrum sensing parameters and may utilize these parameters in spectrum sensing operations. The results from spectrum sensing may then be transmitted back to CR system 610. As set forth above with respect to the example embodiment of FIG. 9, CR system 610 may utilize the results as inputs when configuring communications in the shared information space at 902. However, in accordance with at least one embodiment of the present invention, the spectrum sensing results provided by these apparatuses may be more relevant as a result of the spectrum sensing control parameters that were previously provided. So, in addition reduced resource expenditures during sensing that may result due to more refined sensing operations, it may also be easier to process spectrum sensing results, and thus, configure communications for the apparatuses participating in the shared information space.

In accordance with various embodiments of the present invention, other activities may occur that may further enhance communication configurations between the apparatuses that are participating in the shared information space. For example, spectrum sensing results received by CR system 610 may further comprise time and/or location information. Time information may identify the instance at which the sensing was performed, duration, etc. Location information may, for example, identify the environment where the sensing took place. Location information may be provided in various formats which may be absolute, such as based on global positioning system coordinate information, or relative, such as identifying that the sensing was performed in proximity to a particular apparatus. The time and or location information may be utilized by CR system 610 during formulation of communication configuration for the shared information space.

For example, CR system 610 may review date information provided in spectrum sensing results in order to determine the validity of the information. If spectrum sensing results are too old, CR system 610 may request that new spectrum sensing results be provided. This request may take the form of new spectrum sensing parameters being transmitted to one or more apparatuses participating in the shared information space. Further, the location information that is provided with spectrum sensing results may be evaluated in a similar manner. CR system 610 may determine that the location corresponding to current spectrum sensing results may not be appropriate in view of changed apparatus position, new communication requests, etc. Thus, CR system 610 may request further spectrum sensing take place. This request may take the form of spectrum sensing parameters being transmitted to different apparatuses in order to account for a location that may not have been subject to sensing operations for particular types of interference.

Figure 12:
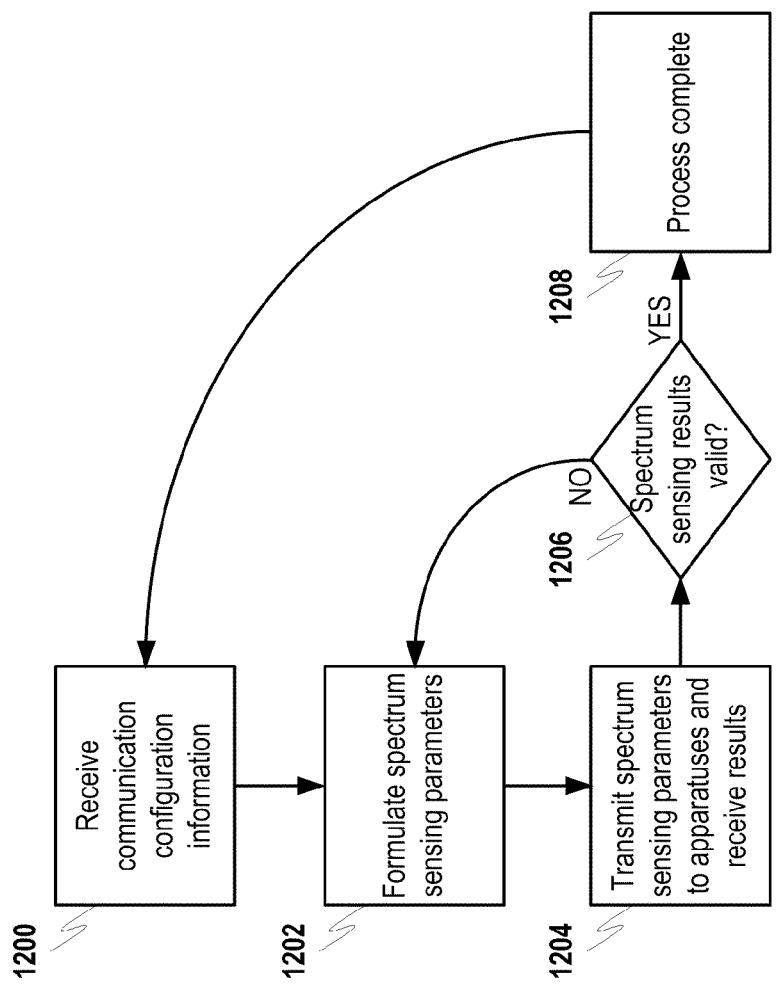
FIG. 12 discloses a flowchart of an example process for configuring spectrum sensing and sharing results in accordance with at least one embodiment of the present invention.

A flowchart of an example communication configuration process in accordance with at least one embodiment of the present invention is disclosed in FIG. 12. In step 1200 communication configuration information may be received in an apparatus from, for example, one or more apparatuses that are participating in a shared information space. The communication configuration information may then be utilized by, for example, control components residing in the receiving apparatus in step 1202 to formulate spectrum sensing parameters. The spectrum sensing parameters may then be transmitted to one or more apparatuses participating in the shared information space in step 1204. The validity of received spectrum sensing results may then be determined in step 1206. This determination may comprise, for example, determining if time and/or location information is acceptable in view of pending communication transactions in the shared information space. If the received spectrum sensing results are determined to be invalid, then the process may return to step 1202 where new spectrum sensing parameters may be generated and transmitted to one or more of the apparatuses that are participating in the shared information space. Otherwise, if the spectrum sensing results that were received are determined to be valid in step 1206, the process may then be complete in step 1208. The process may then return to step 1200 in preparation for the next reception of communication configuration information.

While various exemplary configurations of the present invention have been disclosed above, the present invention is not strictly limited to the previous embodiments.

For example, the present invention may include, in accordance with at least one example embodiment, an apparatus comprising means for receiving wireless transport information at an apparatus from one or more other apparatuses via communication that occurs within a shared information space established between at least the apparatus and the one or more other apparatuses, means for determining wireless spectrum sensing parameters for at least one of the one or more other apparatuses based on the received wireless transport information, means for transmitting the wireless spectrum sensing parameters from the apparatus to the at least one of the one or more other apparatuses via the shared information space, and means for receiving wireless spectrum sensing results at the apparatus from the at least one of the one or more other apparatuses via the shared information space.

Another configuration in accordance with an example embodiment of the present invention may include a carrier signal for causing an apparatus to receive wireless transport information from one or more other apparatuses via communication that occurs within a shared information space established between at least the apparatus and the one or more other apparatuses, determine wireless spectrum sensing parameters for at least one of the one or more other apparatuses based on the received wireless transport information; transmit the wireless spectrum sensing parameters from the apparatus to the at least one of the one or more other apparatuses via the shared information space, and receive wireless spectrum sensing results at the apparatus from the at least one of the one or more other apparatuses via the shared information space.

Accordingly, it will be apparent to persons skilled in the relevant art that various changes in forma and detail can be made therein without departing from the spirit and scope of the invention. The breadth and scope of the present invention should not be limited by any of the above-described example embodiments, but should be defined only in accordance with the following claims and their equivalents.

What is claimed:

1. A method, comprising:
 receiving configuration information at an apparatus from one or more other apparatuses via communication that occurs within a shared information space established between at least the apparatus and the one or more other apparatuses;
 determining wireless spectrum sensing parameters for at least one of the one or more other apparatuses based on the received configuration information;
 transmitting the wireless spectrum sensing parameters from the apparatus to the at least one of the one or more other apparatuses via the shared information space; and
 receiving wireless spectrum sensing results at the apparatus from the at least one of the one or more other apparatuses via the shared information space,
 wherein determining wireless spectrum sensing parameters includes using the received configuration information as an input when formulating a strategy for spectrum sensing in areas of an environment in which the apparatus and the one or more other apparatuses are operating, the wireless spectrum sensing parameters being used to configure apparatuses for implementing the spectrum sensing strategy.

2. The method of claim 1, wherein the configuration information includes wireless transport information that at least identifies wireless transports that are supported by each of the one or more other apparatuses.

3. The method of claim 1, wherein the wireless spectrum sensing parameters indicate at least one of a frequency range to sense or a wireless transport to utilize for sensing.

4. The method of claim 1, wherein the wireless spectrum sensing results further comprise at least one of time information and location information.

5. The method of claim 4, wherein the apparatus invalidates the received wireless spectrum sensing results based on at least one of the time information and the location information.

6. A computer program product comprising compute executable program code recorded on a non-transitory computer readable storage medium, the computer executable program code comprising:
   code configured to cause an apparatus to receive configuration information at an apparatus from one or more other apparatuses via communication that occurs within a shared information space established between at least the apparatus and the one or more other apparatuses;
   code configured to cause an apparatus to determine wireless spectrum sensing parameters for at least one of the one or more other apparatuses based on the received configuration information;
   code configured to cause an apparatus to transmit the wireless spectrum sensing parameters from the apparatus to the at least one of the one or more other apparatuses via the shared information space; and
   code configured to cause an apparatus to receive wireless spectrum sensing results at the apparatus from the at least one of the one or more other apparatuses via the shared information space,
   wherein code configured to cause an apparatus to determine wireless spectrum sensing parameters includes code configured to use the received configuration information as an input when formulating a strategy for spectrum sensing in areas of an environment in which the apparatus and the one or more other apparatuses are operating, the wireless spectrum sensing parameters being used to configure apparatuses for implementing the spectrum sensing strategy.

7. The computer program product of claim 6, wherein the configuration information includes wireless transport information that at least identifies wireless transports that are supported by each of the one or more other apparatuses.

8. The computer program product of claim 6, wherein the wireless spectrum sensing parameters indicate at least one of a frequency range to sense or a wireless transport to utilize for sensing.

9. The computer program product of claim 6, wherein the wireless spectrum sensing results further comprise at least one of time information and location information.

10. The computer program product of claim 9, further comprising code configured to cause the apparatus to invalidate the received wireless spectrum sensing results based on at least one of the time information and the location information.

11. An apparatus, comprising:
   at least one processor; and
   at least one memory including executable instructions, the at least one memory and the executable instructions being configured to, in cooperation with the at least one processor, cause the apparatus to perform at least the following:
      receive configuration information from one or more other apparatuses via communication that occurs within a shared information space established between at least the apparatus and the one or more other apparatuses;
      determine wireless spectrum sensing parameters for at least one of the one or more other apparatuses based on the received configuration information;
      transmit the wireless spectrum sensing parameters to the at least one of the one or more other apparatuses via the shared information space; and
      receive wireless spectrum sensing results the at least one of the one or more other apparatuses via the shared information space,
      wherein determining wireless spectrum sensing parameters includes using the received configuration information as an input when formulating a strategy for spectrum sensing in areas of an environment in which the apparatus and the one or more other apparatuses are operating, the wireless spectrum sensing parameters being used to configure apparatuses for implementing the spectrum sensing strategy.

12. The apparatus of claim 11, wherein the configuration information includes wireless transport information that at least identifies wireless transports that are supported by each of the one or more other apparatuses.

13. The apparatus of claim 11, wherein at least one cognitive radio component existing in the shared information space and residing on the apparatus is configured to receive the wireless transport information, determine the wireless spectrum sensing parameters, transmit the wireless spectrum sensing parameters and receive the wireless spectrum sensing results.

14. The apparatus of claim 11, wherein the wireless spectrum sensing parameters indicate at least one of a frequency range to sense or a wireless transport to utilize for sensing.

15. The apparatus of claim 11, wherein the wireless spectrum sensing results further comprise at least one of time information and location information.

16. The apparatus of claim 15, wherein the apparatus is configured to invalidate the received wireless spectrum sensing results based on at least one of the time information and the location information.

17. A system, comprising:
   an apparatus; and
   one or more other apparatuses configured to communicate with the apparatus via a shared information space established between the apparatus and the one or more other apparatuses;
   the apparatus configured to receive configuration information from one or more other apparatuses via the shared information space and determine wireless spectrum sensing parameters for at least one of the one or more other apparatuses based on the received configuration information;
   the apparatus further configured to transmit the wireless spectrum sensing parameters to the at least one of the one or more other apparatuses and receive wireless spectrum sensing results from the at least one of the one or more other apparatuses via the shared information space, wherein determining wireless spectrum sensing parameters includes using the received configuration information as an input when formulating a strategy for spectrum sensing in areas of an environment in which the apparatus and the one or more other apparatuses are operating, the wireless spectrum sensing parameters being used to configure apparatuses for implementing the spectrum sensing strategy.

* * * * *